(12) United States Patent
Weyerhaeuser et al.

(10) Patent No.: US 10,324,930 B2
(45) Date of Patent: *Jun. 18, 2019

(54) DATABASE CALCULATION ENGINE WITH NESTED MULTIPROVIDER MERGING

(71) Applicant: SAP SE, Walldorf (DE)

(72) Inventors: Christoph Weyerhaeuser, Heidelberg (DE); Tobias Mindnich, Sulzbach (DE); Johannes Merx, Heidelberg (DE); Julian Schwing, Mannheim (DE); Daniel Patejdl, Karlsruhe (DE); Isil Pekel, Heidelberg (DE)

(73) Assignee: SAP SE, Walldorf (DE)

( * ) Notice: Subject to any disclaimer, the term of this patent is extended or adjusted under 35 U.S.C. 154(b) by 529 days.

This patent is subject to a terminal disclaimer.

(21) Appl. No.: 14/723,205

(22) Filed: May 27, 2015

(65) Prior Publication Data

US 2016/0350374 A1 Dec. 1, 2016

(51) Int. Cl.
*G06F 16/20* (2019.01)
*G06F 16/2453* (2019.01)
*G06F 16/27* (2019.01)
*G06F 16/28* (2019.01)

(52) U.S. Cl.
CPC ...... *G06F 16/24544* (2019.01); *G06F 16/278* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 7,934,018 B1* | 4/2011 | Lavallee | ............ | H04L 67/1095 709/218 |
| 2006/0218123 A1* | 9/2006 | Chowdhuri | ....... | G06F 17/30445 |
| 2012/0290575 A1* | 11/2012 | Hu | .................... | G06F 17/30646 707/737 |
| 2014/0372365 A1* | 12/2014 | Weyerhaeuser | .. | G06F 17/30592 707/602 |

\* cited by examiner

*Primary Examiner* — Jau Shya Meng
(74) *Attorney, Agent, or Firm* — Mintz, Levin, Cohn, Ferris, Glovsky and Popeo, P.C.

(57) ABSTRACT

A query is received by a database server from a remote application server that is associated with a calculation scenario that defines a data flow model including one or more calculation nodes including stacked multiproviders. Subsequently, the database server instantiates the calculation scenario and afterwards optimizes the calculation scenario. As part of the optimization, the calculation scenario is optimized by merging the two multiproviders. Thereafter, the operations defined by the calculation nodes of the optimized calculation scenario can be executed to result in a responsive data set. Next, the data set is provided to the application server by the database server.

20 Claims, 7 Drawing Sheets

DATABASE CALCULATION ENGINE WITH NESTED MULTIPROVIDER MERGING

TECHNICAL FIELD

The subject matter described herein relates to a database system that incorporates a calculation engine that first instantiates calculation scenarios and then optimizes calculation scenarios in which, as part of the optimization process, nested multiproviders are merged.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

SUMMARY

In one aspect, a query is received by a database server from a remote application server. The query is associated with a calculation scenario that defines a data flow model that includes one or more calculation nodes arranged in a hierarchy. The data flow nodes initially specifying two or more stacked multiproviders that each respectively have two or more associated part providers. The uppermost multiprovider is a root multiprovider and each child multiprovider is a sub multiprovider. Thereafter, the database server first instantiates the calculation scenario and afterwards optimizes the calculation scenario. In some variations, at least one sub multiprovider is merged with the root multiprovider if its criteria is met. The database server then executes the operations defined by the calculation nodes of the optimized calculation scenario to result in a responsive data set. The responsive data set can later be provided by the database server to the application server.

The merging can include combining attributes specified on at least one sub multiprovider and on at least one part provider with attributes of the root multiprovider.

The merging can include adding each part provider of each sub multiprovider to the root multiprovider.

The merging can include summing up all count key figures of the at least one sub multiprovider at the root multiprovider. The summing can include mapping count key figures on the at least one sub multiprovider to sum key figures on the root multiprovider and summing up all count key figures using a calculated attribute.

There can be a plurality of sub multiproviders, and with such variations, the mapping can include determining which of the plurality of sub multiproviders can be merged and which of the sub multiproviders cannot be merged such that only the sub multiproviders determined to be mergeable are merged with the root multiprovider.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter allows for multiproviders forming part of a calculation scenario to be merged during a calculation scenario optimization process. As a result, unnecessary intermediate results can be avoided which, in turn, results in more efficient query processing. Further, the current subject matter is advantageous in that it allows for the combination of two or more stacked multiproviders into a single multiprovider while, at the same time, handling count key figures. Such an arrangement can avoid redundant aggregations at sub multiprovider levels.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides methods, systems, and computer program products to speed up query processing by removing unnecessary aggregations and consequently reducing the query overhead of creating individual OLAP engine searches for each multiprovider. These benefits are achieved by merging stacked multiproviders, which avoids the creation of intermediate results and requires less query processing in the database. Complex multiprovide merge rules ensure that the semantic of the root and sub multiproviders is still given after their being merged.

Figure 1:
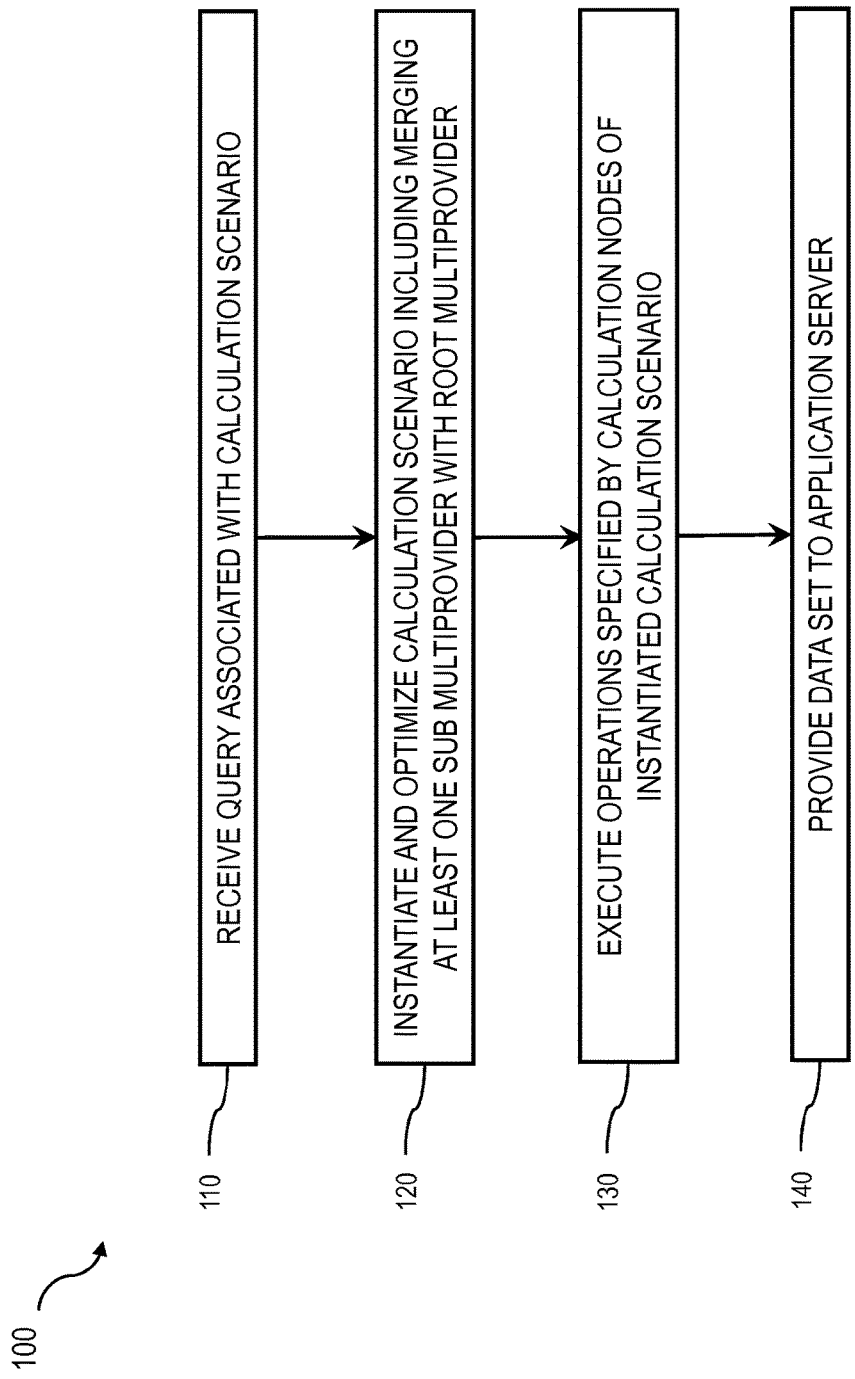
FIG. 1 is a process flow diagram illustrating execution of a calculation scenario.

FIG. 1 is a process flow diagram 100 illustrating a method in which, at 110, a database server receives a query from a remote application server. The query is associated with a calculation scenario that defines a data flow model that includes one or more calculation nodes arranged in a hierarchy. The data flow initially specifies two or more stacked multiproviders that each respectively have two or more associated part providers, the uppermost multiprovider being a root multiprovider and each child multiprovider being a sub multiprovider. Thereafter, at 120, the database server instantiates and optimizes the calculation scenario. The optimizing includes merging at least one sub multiprovider with the root multiprovider. Next, at 130, the database server executes the operations defined by the calculation nodes of the optimized calculation scenario to result in a responsive data set. Later, at 140, the database server provides the data set to the application server.

Figure 2:
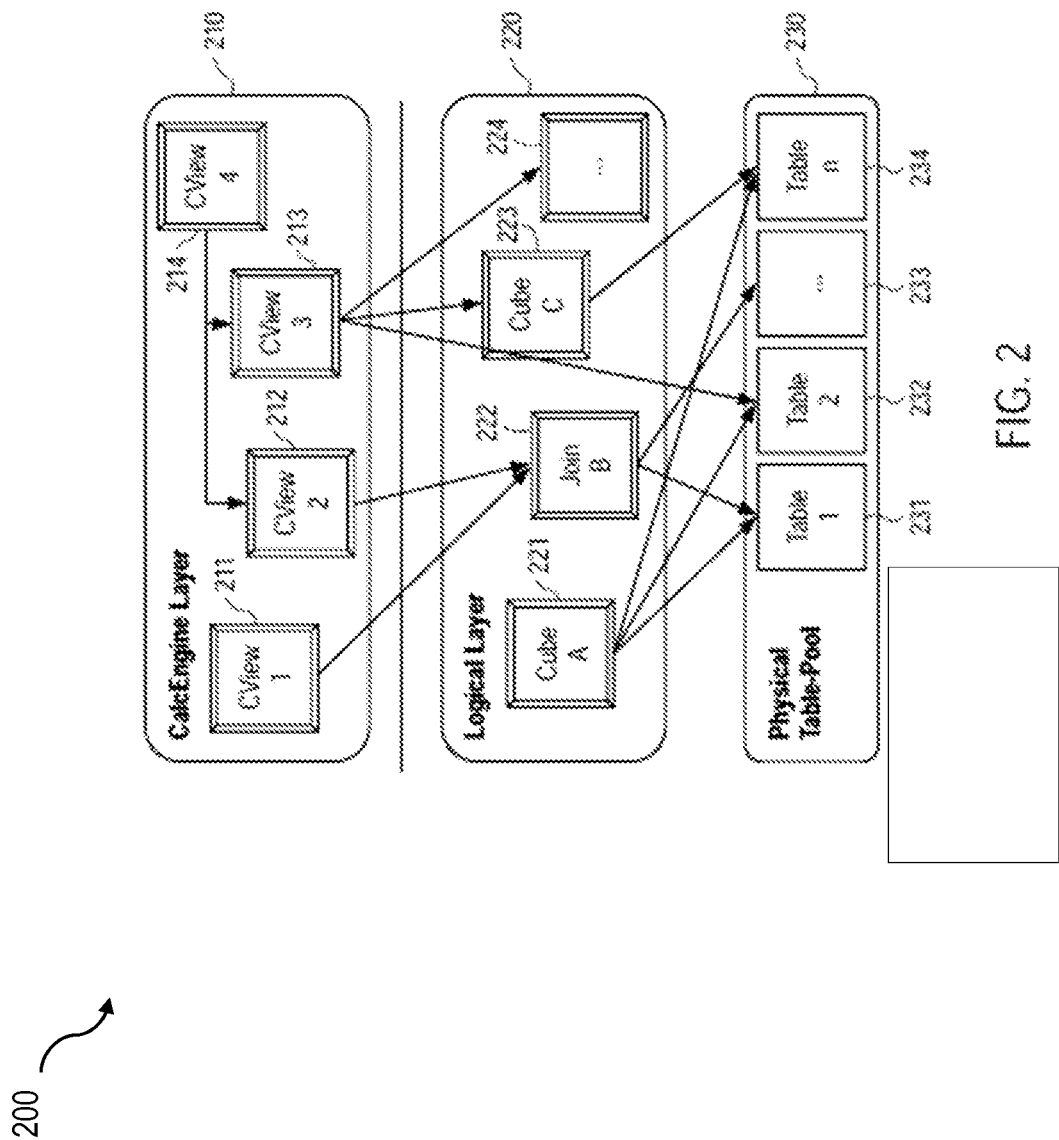
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, multiprovider and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
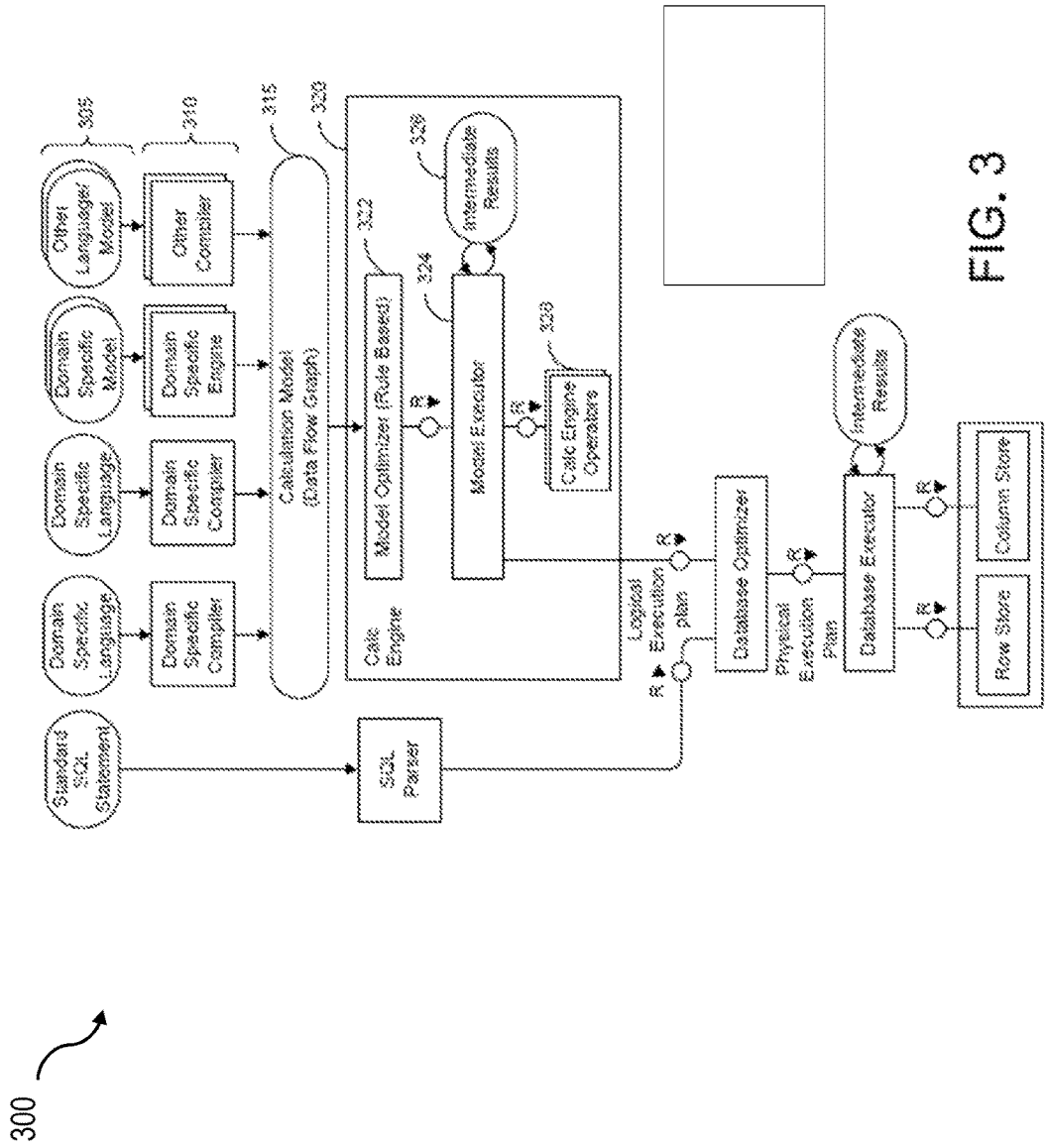
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, multiprovider, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first instantiate the calculation scenario and afterward optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node, or merging of stacked multiproviders. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like. The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

The calculation engine 320 can offer model designers the possibility to enrich their data model with a forced filter pushdown semantic which can be seen as a generic and flexible way to express a filter injection. In contrast to simply allowing a user to specify a filter condition on a specific node level, the current subject matter is directed to a forced filter pushdown feature. With a forced filter pushdown feature, if attributes are flagged for forced pushdown in a query, the calculation engine 320 can ensure that all attributes are removed on the defined data flow graph (as part of the instantiation process). In some variations, a runtime error can be indicated if attributes are still required on the defined data flow path. With such functionality, users can easily access the logic in normal SQL WHERE conditions and, in some cases, specifically request such attributes.

The calculation engine business warehouse architecture can use multiproviders for query handling. Multiproviders can be characterized as defining a union operation combined with an aggregation function and enhanced column mapping (constant mapping) information. Some architectures can have multiproviders that include hundreds of part providers. A part provider is typically a semantic partition that holds data for a particular attribute (e.g. for a specific accounting year or a specific accounting region, etc.). Business warehouse queries can sometimes include more than one multiprovider which are stacked on top of each other. This means that the data of the lower multiproviders are often aggregated multiple times. This slows down queries on multiproviders and is often uneccessary, especially if the aggregation level does not change.

With the current subject matter, the calculation engine model optimizer 322 can optimize a query such that two or more stacked multiproviders are merged. The uppermost/parent multiprovider can be referred to as a root provider and each descendant multiprovider can be characterized as a sub multiprovider. Each multiprovider, in turn, can be composed of two or more part providers.

In order to effect the merging, mapping information of attributes of the root multiprovider, the sub multiprovider, and each part provider (to be merged) is combined. Mappings can be simple renamings of attributes, e.g. on the root multiprovider the attribute name is "city" and on the sub multiprovider "store_location". Additionally mapping attributes to constant values is also possible, e.g. for one partprovider the "country" column is mapped to a constant value "US" and for a second partprovider the "country" column is mapped to a constant value "DE".

Further, the part providers of the sub multiproviders that are to be merged can be added to the root multiprovider as new part providers. For example, if a root multiprovider having one part provider and a sub multiprovider (having two part providers) are merged the resulting multiprovider would have three part providers).

The merging process can also handle count key figures on the sub multiprovider. Key figures are sometimes described as criteria for evaluating the performance of a logistical activity in the past, or for projecting the performance of a logistical activity in the future. In some arrangements, the count key figures of all stacked multiproviders can be summed up at the root multiprovider. In order to achieve these count key figures, sub multiproviders can be mapped to sum key figures on the root multiprovider. In addition, all count key figures can be summed up by the means of a calculated attribute.

Still further, in some arrangements in which there are more than two sub multiproviders, it can be first determined whether each of the sub multiproviders is mergeable or non-mergeable. After such a determination, all sub multiproviders that can be merged are merged with the root provider and all non-mergeable sub multiproviders remain untouched.

It can be first checked that a sub multiprovider can be merged and, if so, the calculation engine runtime model can be modified by the calculation engine model optimizer 322. In general, a sub multiprovider can be merged with a root multiprovider if (i) the sub multiprovider has only one output, (ii) the sub multiprovider does not use calculated or restricted attributes (where a restricted attribute could be "sales" only for a certain year "2015" which implies that the restricted sales attribute ("res_sales") is taken from a "sales" column whenever 2015 is the value of the "year" column in the same row and NULL otherwise), (iii) the sub multiprovider does not have a filter, (iv) the sub multiprovider does not have hierarchy information (i.e., a column representing the "city" where a store is located but reporting should be also possible on "country" level where in the hierarchy the information is stored which city belongs to which country), (v) all mappings can be combined using the specified rules (i.e., for one partprovider the "year" column is mapped to a constant value 2015 whereas for another partprovider the "year" column is renamed to "accounting_year"), or (vi) the sub multiprovider does not use special count key figures or such count key figures can be handled The model optimizer 322 can combine the runtime mappings in a variety of ways. For example:

Parent Node: Constant Mapping, Child Node: Constant Mapping (only if both values match); Result: Copy Constant Mapping of the child node.

Parent Node: Constant Mapping, Child Node: Explicit Mapping; Result: Copy Constant Mapping of the parent node.

Figure 4:
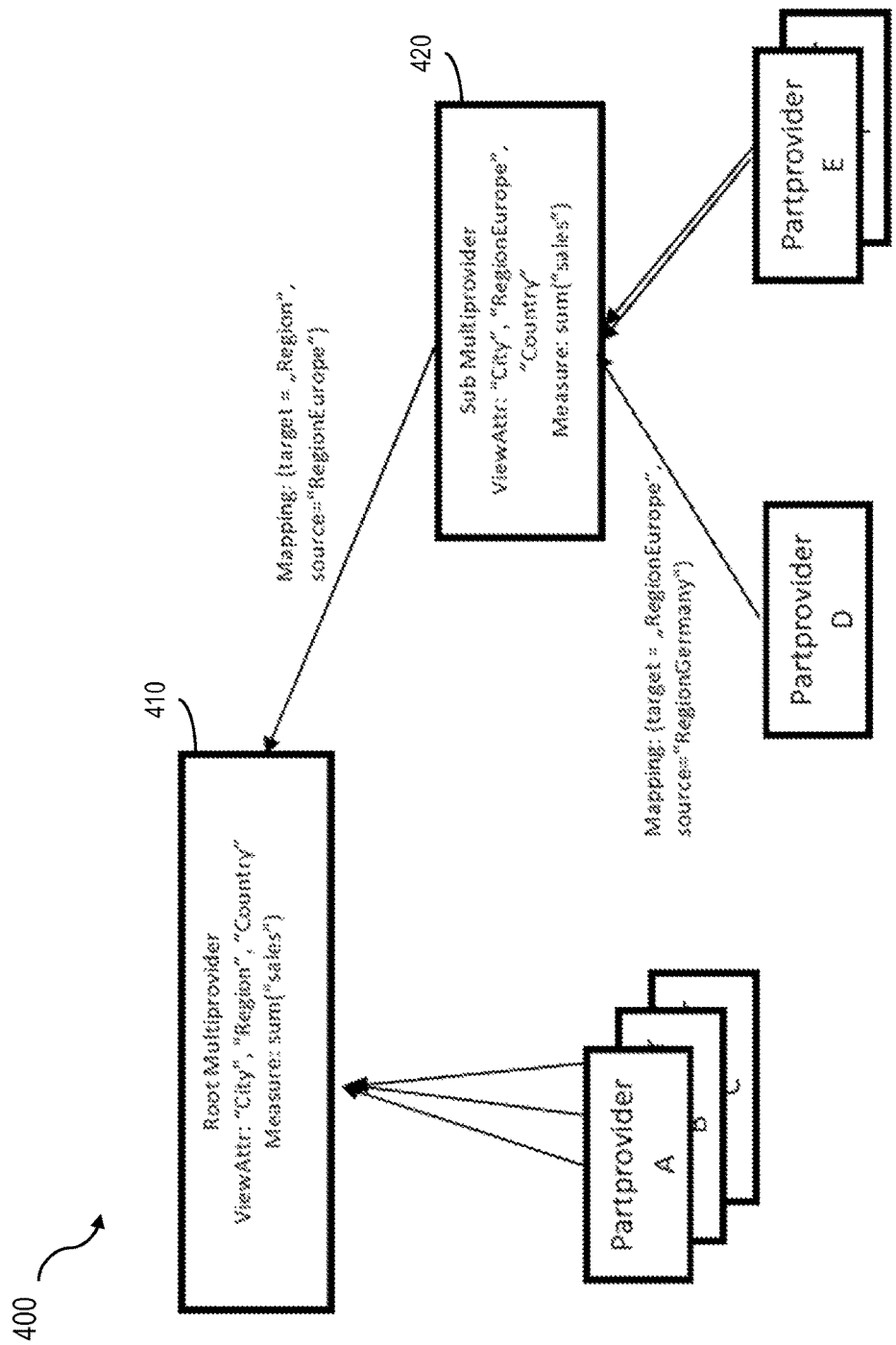
FIG. 4 is a diagram illustrating a calculation scenario having a root multiprovider and a sub multiprovider.
Figure 5:
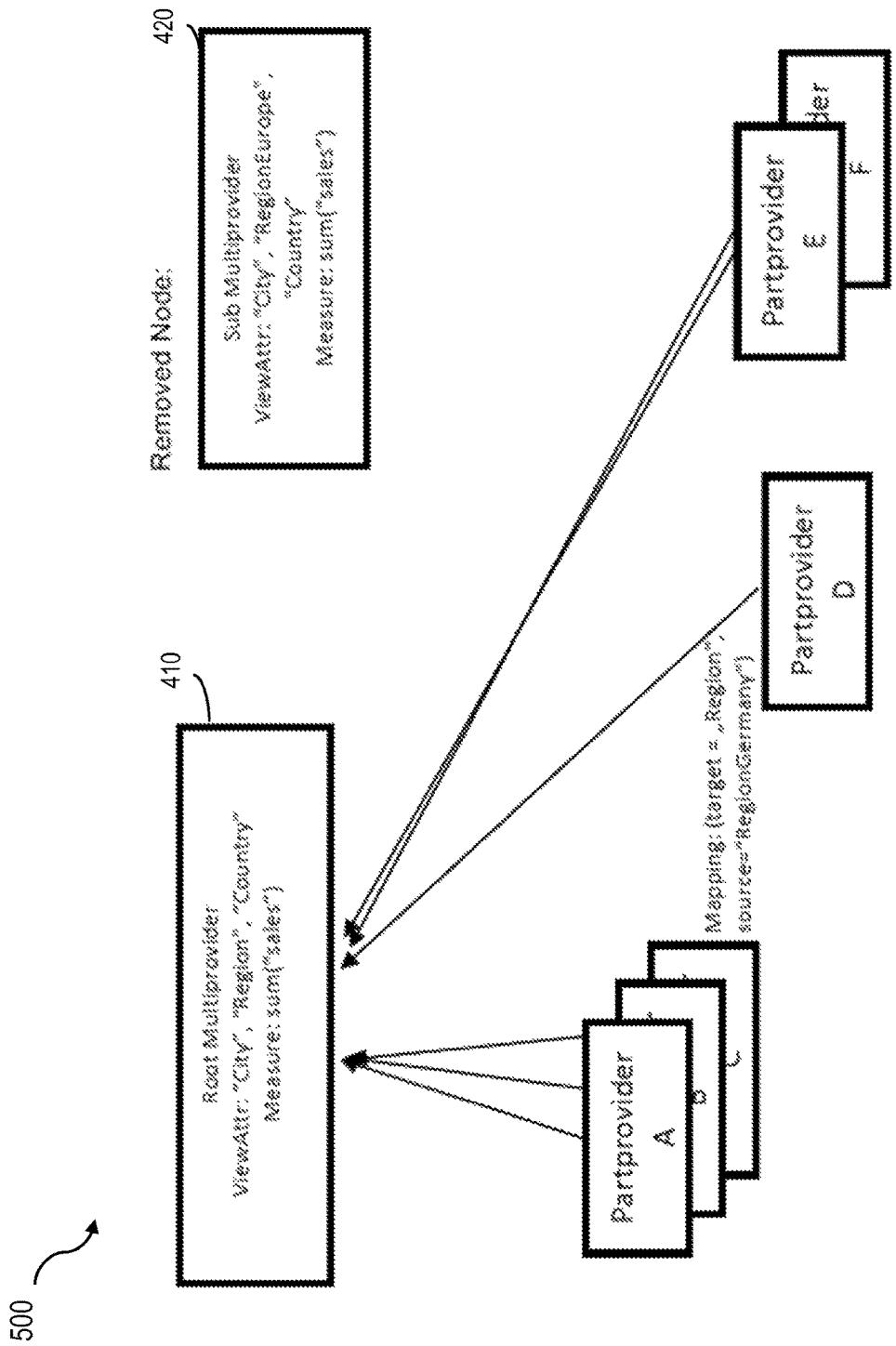
FIG. 5 is a diagram illustrating an optimized version of the calculation scenario of FIG. 4.

Parent Node: Explicit Mapping, Child Node: Constant Mapping; Result: Copy Constant Mapping of child node with target of parent node mapping Parent Node: Explicit Mapping, Child Node: Explicit Mapping; Result: Explicit Mapping with target of parent node mapping and source of child node mapping FIGS. 4 and 5 are diagrams 400, 500 that respectively illustrate a calculation model before and after merging of a sub multiprovider 420 with a root multiprovider 410. With reference to FIG. 4, the root multiprovider 410 has associated part providers A-C and the sub multiprovider 420 has associated part providers D-F. With reference to FIG. 5, as part of the optimization process implemented by the calculation model optimizer 322, runtime mappings can be combined along the path from the root multiprovider 410 to the part providers (D-F) of sub multiprovider 420.

Figure 6:
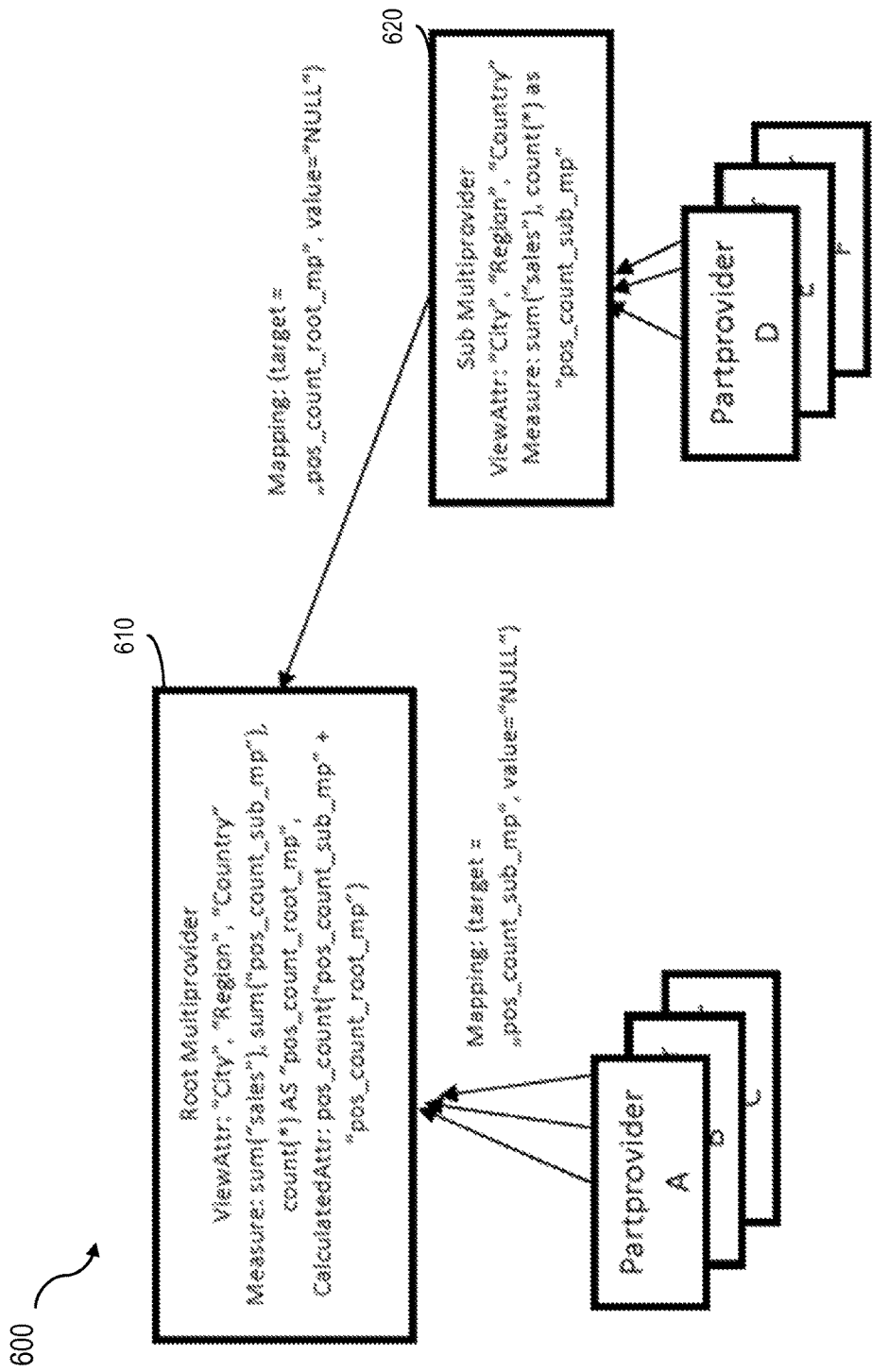
FIG. 6 is a diagram illustrating a calculation scenario having a root multiprovider and a sub multiprovider that handles count key figures.
Figure 7:
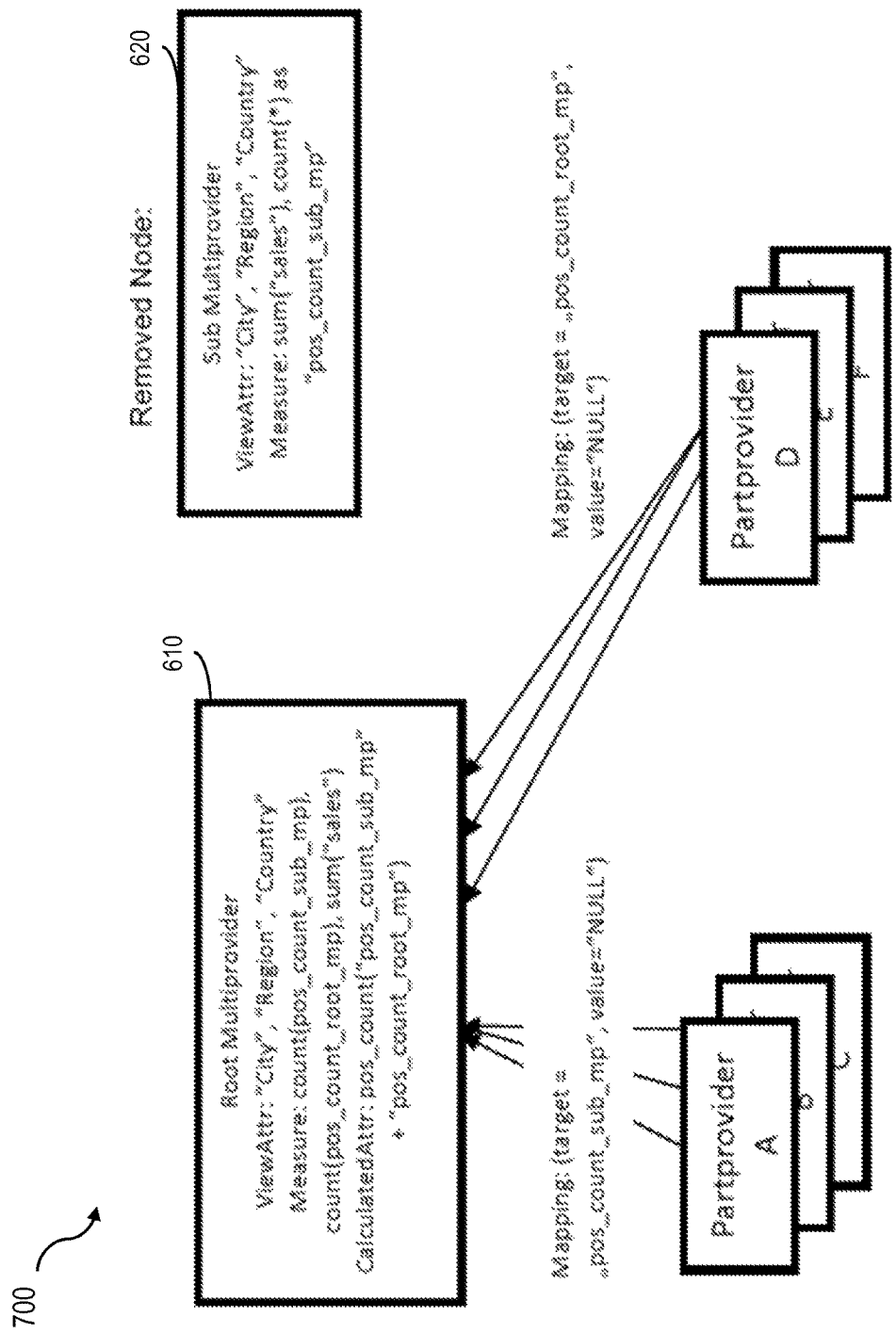
FIG. 7 is a diagram illustrating an optimized version of the calculation scenario of FIG. 6.

FIGS. 6 and 7 are diagrams 600, 700 that respectively illustrate a calculation model before and after merging of a sub multiprovider 620 with a root multiprovider 610. With reference to FIG. 6, the root multiprovider 610 has associated part providers A-C and the sub multiprovider 620 has associated part providers D-F. With reference to FIG. 7, as part of the optimization process implemented by the calculation model optimizer 322, special count key figures on the sub multiprovider 620 can be handled if they fulfill the following requirements. First, the special count key figure of the sub multiprovider 620 can be mapped to a sum key figure on the root multiprovider 610. In addition, all other inputs of the root multiprovider 610 either map the special count key figure to NULL or are merged themselves and provide the same special count key figure.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving, by a database server from a remote application server, a query that is associated with a calculation scenario that defines a data flow model that includes a plurality of calculation nodes arranged in a directed acyclic graph comprising a plurality of paths representing data flows between calculation nodes, the calculation nodes comprising a plurality of multiproviders and a plurality of parts providers, each part provider a semantic partition of a data set, each semantic partition storing data for an attribute, each multiprovider defining a union operation combined with an aggregation function that aggregates data from the semantic partitions for at least one attribute, the data flow initially specifying two or more stacked multiproviders that each respectively define the union operation and the aggregation function for the at least one attribute from two or more associated part providers, the at least one attribute mapped between the two or more associated part providers and at least one of the two or more stacked multiproviders, an uppermost multiprovider of the two or more stacked multiproviders being a root multiprovider and at least one child multiprovider of the two or more stacked multiproviders being a sub multiprovider, the sub multiprovider being a descendent of the root multiprovider, the root multiprovider defining a union operation and aggregating data from the semantic partitions defined by the part providers associated with each sub multiprovider;
   instantiating and optimizing, by the database server, the calculation scenario, the optimizing comprising merging at least one sub multiprovider of the two or more stacked multiproviders with the root multiprovider, the merging comprising mapping the at least one corresponding attribute between each of the two or more part providers associated with each merging sub multiprovider to the root multiprovider;
   executing, by the database server, a plurality of operations defined by the calculation nodes of the optimized calculation scenario to result in a responsive data set; and
   providing, by the database server to the application server, the responsive data set.

2. The method of claim 1, wherein the merging comprises combining attributes specifying the at least one sub multiprovider and at least one part provider with attributes of the root multiprovider.

3. The method of claim 1, wherein the merging comprises associating each part provider of each sub multiprovider to the root multiprovider.

4. The method of claim 1, wherein the merging comprises: summing up all count key figures of the at least one sub multiprovider at the root multiprovider.

5. The method of claim 4, wherein the summing comprises:
   mapping count key figures on the at least one sub multiprovider to sum key figures on the root multiprovider and summing up all count key figures using a calculated attribute.

6. The method of claim 1, wherein there are a plurality of sub multiproviders and the mapping comprises:
   determining which of the plurality of sub multiproviders can be merged and which of the sub multiproviders cannot be merged such that only the sub multiproviders determined to be mergeable are merged with the root multiprovider.

7. The method of claim 1, wherein at least a portion of paths and/or attributes defined by the calculation scenario are not required to respond to the query, and wherein the instantiated calculation scenario omits the paths and attributes defined by the calculation scenario that are not required to respond to the query.

8. The method of claim 1, wherein at least one of the calculation nodes filters results obtained from the database server.

9. The method of claim 1, wherein at least one of the calculation nodes sorts results obtained from the database server.

10. The method of claim 1, wherein the calculation scenario is instantiated in a calculation engine layer by a calculation engine.

11. The method of claim 1, wherein the calculation scenario is optimized in a calculation engine layer by a calculation engine.

12. The method of claim 11, wherein the calculation engine layer interacts with a physical table pool and a logical layer, the physical table pool comprising physical tables containing data to be queried, and the logical layer defining a logical metamodel joining at least a portion of the physical tables in the physical table pool.

13. The method of claim 12, wherein the calculation engine invokes an SQL processor for executing set operations.

14. The method of claim 13, wherein each calculation node has at least one output table that is used to generate the data set.

15. The method of claim 1, wherein an input for each calculation node comprises one or more of: a physical index, a join index, an OLAP index, and another calculation node.

16. The method of claim 15, wherein at least one calculation node consumes an output table of another calculation node.

17. The method of claim 1, wherein the executing comprises:
forwarding the query to a calculation node in the calculation scenario that is identified as a default node if the query does not specify a calculation node at which the query should be executed.

18. The method of claim 1, wherein each multiprovider of the two or more stacked multiproviders further defines enhanced column mapping information.

19. A computer program product comprising a non-transitory machine-readable medium storing instructions which, when executed by at least one data processor forming part of at least one computing device, result in operations comprising:
receiving, by a database server from a remote application server, a query that is associated with a calculation scenario that defines a data flow model that includes a plurality of calculation nodes arranged in a directed acyclic graph comprising a plurality of paths representing data flows between calculation nodes, the calculation nodes comprising a plurality of multiproviders and a plurality of parts providers, each part provider a semantic partition of a data set, each semantic partition storing data for an attribute, each multiprovider defining a union operation combined with an aggregation function that aggregates data from the semantic partitions for at least one attribute, the data flow initially specifying two or more stacked multiproviders that each respectively define the union operation and the aggregation function for the at least one attribute from two or more associated part providers, the at least one attribute mapped between the two or more associated part providers and at least one of the two or more stacked multiproviders, an uppermost multiprovider of the two or more stacked multiproviders being a root multiprovider and at least one child multiprovider of the two or more stacked multiproviders being a sub multiprovider, the sub multiprovider being a descendent of the root multiprovider, the root multiprovider defining a union operation and aggregating data from the semantic partitions defined by the part providers associated with each sub multiprovider;

instantiating and optimizing, by the database server, the calculation scenario, the optimizing comprising merging at least one sub multiprovider of the two or more stacked multiproviders with the root multiprovider, the merging comprising mapping the at least one corresponding attribute between each of the two or more part providers associated with each merging sub multiprovider to the root multiprovider;

executing, by the database server, a plurality of operations defined by the calculation nodes of the optimized calculation scenario to result in a responsive data set; and providing, by the database server to the application server, the responsive data set.

20. A system comprising:
at least one data processor; and
memory storing instructions which, when executed by the at least one data processor, result in operations comprising:
receiving, by a database server from a remote application server, a query that is associated with a calculation scenario that defines a data flow model that includes a plurality of calculation nodes arranged in a directed acyclic graph comprising a plurality of paths representing data flows between calculation nodes, the calculation nodes comprising a plurality of multiproviders and a plurality of parts providers, each part provider a semantic partition of a data set, each semantic partition storing data for an attribute, each multiprovider defining a union operation combined with an aggregation function that aggregates data from the semantic partitions for at least one attribute, the data flow initially specifying two or more stacked multiproviders that each respectively define the union operation and the aggregation function for the at least one attribute from two or more associated part providers, the at least one attribute mapped between the two or more associated part providers and at least one of the two or more stacked multiproviders, an uppermost multiprovider of the two or more stacked multiproviders being a root multiprovider and at least one child multiprovider of the two or more stacked multiproviders being a sub multiprovider, the sub multiprovider being a descendent of the root multiprovider, the root multiprovider defining a union operation and aggregating data from the semantic partitions defined by the part providers associated with each sub multiprovider;

instantiating and optimizing, by the database server, the calculation scenario, the optimizing comprising merging at least one sub multiprovider of the two or more stacked multiproviders with the root multiprovider, the merging comprising mapping the at least one corresponding attribute between each of the two or more part providers associated with each merging sub multiprovider to the root multiprovider;

executing, by the database server, a plurality of operations defined by the calculation nodes of the optimized calculation scenario to result in a responsive data set; and providing, by the database server to the application server, the responsive data set.

* * * * *